United States Patent Office 3,549,536
Patented Dec. 22, 1970

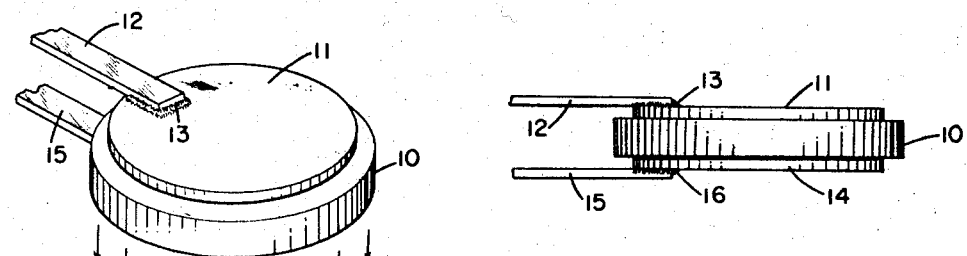
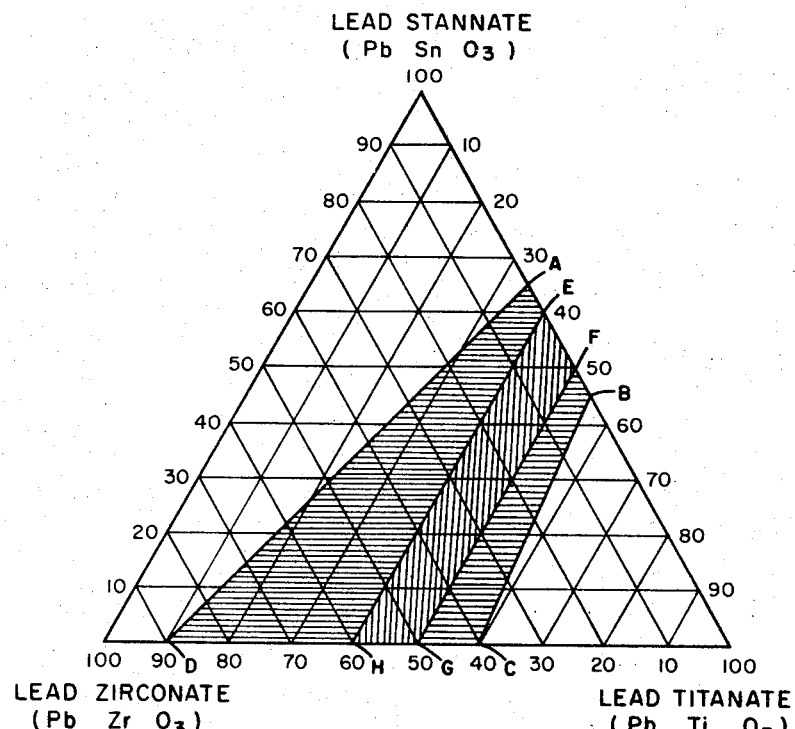

1

3,549,536
LEAD ZIRCONATE-TITANATE CONTAINING
MANGANESE ADDITIVE
Antonio Lungo, Middleburg Heights, and Donald E. Bonnema, Maple Heights, Ohio, assignors to Clevite Corporation, a corporation of Ohio
Filed July 6, 1964, Ser. No. 380,443
Int. Cl. C04b 35/46, 35/48
U.S. Cl. 252—62.9
18 Claims

ABSTRACT OF THE DISCLOSURE

The invention is directed to ferroelectric ceramic compositions consisting essentially of lead zirconate-titanate and containing manganese in an amount corresponding on a mol basis to an addition of about 0.05 to 0.8 weight percent of manganese oxide. The manganese additive improves the mechanical Q of the ceramics in their utility as piezoelectric transducers. Other additives such as chromium and iron in combination with the manganese and/or alkaline earths as substituents for lead up to 20 atom percent are disclosed.

This invention relates to ferroelectric ceramic materials suitable for use as the active element in an electromechanical transducer, and to transducers embodying such ceramic materials.

The ceramics to which the present invention pertains are polycrystalline aggregates fired to ceramic maturity and thereafter polarized, or capable of being polarized, to impart thereto electromechanical transducing properties similar to the well-known piezoelectric effect. Such ceramics may be embodied in transducers for producing, sensing and/or measuring sound, shock, vibration, pressures, and for various other applications, such as electromechanical wave filters.

A ceramic of principal importance for such applications is lead zirconate titanate, which is a polycrystalline material composed principally of $PbZrO_3$ and $PbTiO_3$ effectively in solid solution. Compositions of this general type and their properties are disclosed in U.S. Letters Pat. No. 2,708,244 to Bernard Jaffe.

In addition to lead zirconate titanate, other ferro-electric ceramic materials of interest for various electromechanical transducer application are lead titanate-lead stannate, and the ternary system lead zirconate-lead titanate-lead stannate, as disclosed in U.S. Letters Pat. No. 2,849,404 to Jaffe, et al., in National Bureau of Standards Report No. 3684 (Jaffe, Roth and Marzullo, Report No. 9, Oct. 1, 1954), and in the article in Journal of Research of the National Bureau of Standards, vol. 55, No. 5, November 1955, pp. 239–254, entitled "Properties of Piezoelectric Ceramics in the Solid-Solution Series Lead Titanate-Lead Zirconate-Lead Oxide: Tin Oxide and Lead Titanate-Lead Hafnate."

Certain properties of these ceramic materials have been improved by the addition of other elements in small amounts. For example, as disclosed in U.S. Letters Pat. No. 3,006,857 to Kulcsar, the addition of a small amount of chromium or uranium to lead zirconate titanate greatly enhances the properties desired for electromechanical wave filter applications. As other examples, the addition of a small amount of strontium or calcium to lead zirconate titanate or lead titanate-lead stannate or lead zirconate-Lead titanate-lead stannate increases its dielectric constant, as disclosed in U.S. Letters Pat. No. 2,906,710 to Kulcsar and Cmolik. Similar results are obtained by the addition of barium, as disclosed in copending U.S. patent application Ser. No. 151,847, filed Nov. 13, 1961, now Pat. No. 3,144,411 and by the addition of magnesium as disclosed in copending U.S. patent application Ser. No. 164,076 filed Jan. 3, 1962, now Pat. No. 3,179,-594.

In the following description and claims, the constituents, lead, zirconium, titanium and tin, in oxidic form, of the compounds in FIG. 3 will be referred to as the "principal constituents" of the ferroelectric ceramic solid solution. The total quantity of such constituents greatly exceeds that of additions which may be provided as partial substituents for the principal constituents. One or more of the alkaline earth metals, strontium, calcium, magnesium, and barium, may be present in the ceramic as substituents for up to 20 atom percent of the lead in the ceramic. These possible alkaline earth substituents have the same valency as the lead replaced, and they will be referred to as "isovalent constituents." Both the "principal constituents" and the "isovalent constituents" are included under the general term "normal oxidic constituents."

It is a principal object of the present invention to provide new piezoelectric ceramic materials characterized by a high mechanical Q.

Another object of the invention is to provide improved ceramic piezoelectric materials for electric wave filter applications.

Another object of the invention is to provide improved ceramic piezoelectric materials characterized by a high mechanical Q.

In accordance with the present invention polycrystalline ceramic materials having as their principal constituents selected solid solutions of lead zirconate, lead titanate and/or lead stannate within the area ABCD of FIG. 3 are modified by the addition of manganese which beneficially results in a higher mechanical Q. Such materials when further modified by the addition of at least one element selected from the group consisting of chromium and uranium possess optimum values of mechanical Q, coupling and dissipation and optimum aging characteristics rendering the materials particularly suitable for electric wave filter applications.

Preferred compositions in accordance wtih the present invention consist essentially of lead zirconate and lead titanate in solid solutions in mol ratios of 65:35 to 40:60 containing manganese preferably in a quantity corresponding on a mol basis to an addition of about 0.05 to 0.8 weight percent of manganese oxide and optionally containing chromium and/or uranium in an aggregate quantity corresponding on a mol basis to an addition of about 0.1 to 1.5 weight percent of chromic oxide. The compositions may optionally contain a quantity of iron corresponding on a mol basis to an addition of 0.1 to 1.0 weight percent of ferric oxide and/or part of the lead may be substituted by one or more of the alkaline earth elements, barium, strontium, calcium and magnesium up to a total of 20 atom percent.

Further objects and advantages of this invention will be apparent from the following detailed description of certain presently-preferred embodiments thereof, described with reference to the accompanying drawing wherein:

FIG. 1 is a perspective view of an electromechanical transducer whose active element may consist of ferroelectric ceramic as described hereinafter;

FIG. 2 is an elevational view of the FIG. 1 transducer; and

FIG. 3 is a triangular compositional diagram of the principal constituents of the ceramic which is modified in accordance with the present invention.

Before proceeding with a description of the present invention, reference is made first to FIGS. 1 and 2 which illustrate an electromechanical transducer which may incorporate ceramic material produced in accordance with the present invention. In the particular embodiment shown, the transducer has as its active element a disc-shaped body 10 of the ceramic. The body 10, after being electrostatically polarized, is provided with a pair of electrodes 11 and 14 applied to its opposite major faces. Leads 12 and 15 are conductively attached by solder 13 and 16, respectively, to the electrodes 11 and 14. These leads may be used to connect the transducer in the electrical circuit (not shown) in which the transducer is to operate.

As is well understood, an electromechanical transducer, such as the particular device shown in FIGS. 1 and 2, converts applied electrical energy to mechanical energy, and vice versa. A voltage applied across the electrodes 11 and 14 produces a strain or mechanical deformation of the ceramic body 10. In the particular arrangement shown, the transducer is adapted to emit sound waves in the direction shown by the arrows in FIG. 1 into an appropriate external medium, which may be solid, liquid or gaseous. Conversely, if the ceramic body 10 is subjected to mechanical stress, the resulting strain generates an electrical output voltage across the electrodes 11 and 14.

The ceramic body 10 is a polycrystalline ceramic composed principally of a solid solution of lead titanate and either lead zirconate or lead stannate, or both. The body also may contain one or more other elements, termed "isovalent constituents," substituting in part for the lead of the lead zirconate and titanate and/or stannate.

The basic compositions fall into three categories: (1) those belonging to the binary system lead zirconate-lead titanate; (2) those belonging to the binary system lead titanate-lead stannate; and (3) those belonging to the ternary system lead zirconate-lead titanate-lead stannate. The designations binary and ternary are used in conjunction with the base materials and in disregard of the additions, including isovalent constituents.

Furthermore, as will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium.

All possible compositions coming within all three of the systems defined above are represented by the triangular diagram constituting FIG. 3 of the drawings. All compositions represented by the diagram, however, are not ferroelectric, and many are electromechanically active only to a very slight degree. The present invention is concerned only with those compositions exhibiting piezoelectric response of appreciable magnitude. As a matter of convenience, the planar coupling, $k_p$ (also known as radial coupling, $k_r$, or disc coupling, $k_{disc}$), of test discs will be taken as a measure of piezoelectric activity. Thus, within the horizontally hatched area bounded by lines connecting points ABCD, FIG. 3, all compositions polarized and tested showed a planar coupling of at least 10 percent. The area bounded by ABCD includes binary lead zirconate-lead titanate solid solutions lying on the line DC along which the mol ratio ($PbZrO_3$-$PbTiO_3$) of the end components varies from 90:10 to 60:40. Among these base line compositions those falling between points H and G have characteristically higher planar couplings with the highest couplings occurring where the $PbZrO_3$:$PbTiO_3$ ratio is around 54:46 to 53:47 in the absence of additions.

The binary compositions on line AB ($PbTiO_3$:$PbSnO_3$ from 35:65 to 55:45) of the FIG. 3 diagram are similar to those on line DC in structure but are characterized by generally lower planar couplings, with the best couplings occurring in compositions falling between points E and F, i.e., with the mol ratio $PbTiO_3$:$PbSnO_3$ in the range 40:60 to 50:50.

In the ternary compositions with the area designated ABCD, the inclusion of $PbSnO_3$ as a substituent for a portion of the $PbZrO_3$ in the base line compositions has the effect of progressively lowering the Curie temperature but the compositions retain a relatively high planar coupling, particularly in the area of the diagram bounded by lines connecting points EFGH.

In accordance with the invention basic compositions have the constituents hereinbefore described are modified by the addition of a manganese compound during preparation of the ferroelectric material. While various manganese compounds may be utilized, manganese oxide $MnO_2$, potassium permanganate $KMnO_4$, manganese carbonate $MnCO_3$ and manganese acetate

$$Mn(C_2H_3O_2)_2:4H_2O$$

are particularly suitable, and are preferred additive compounds. The final composition preferably contains manganese in a quantity corresponding on a mol basis to an addition of about 0.05 to 0.8 weight percent of $MnO_2$.

The compositions proposed may be prepared in accordance with various ceramic procedures, which, in themselves are well known in the art.

A preferred method of preparing the basic compositions involves the use of lead oxide (PbO), zirconia ($ZrO_2$) and titania ($TiO_2$), all of relatively pure grade (e.g., C.P. grade), combined in proper proportions. (In some cases a small excess of lead oxide may be employed to balance the additions.) If barium, strontium, magnesium and/or calcium are to be included, these are added in the form of a reasonably reactive compound. The carbonates of these alkaline earth metals are preferred because of their ready commercial availability at a relatively low cost and in suitable purity. In the reacting of the mixtures, carbonates evolve $CO_2$ and reduce to the respective oxides. The combined ingredients are then wet or dry milled to achieve thorough mixing and particle size reduction.

After this first milling the mixture is dried (if wet milled) and reground briefly to assure as homogeneous a mixture as possible. Also, at this stage the optional addition of iron, chromium and/or uranium may be accomplished by the admixing of iron oxide ($Fe_2O_3$), chromium oxide ($Cr_2O_3$) and/or uranium oxide ($U_3O_8$) in suitable proportions.

After milling, the mixture, either loose or suitably formed into desired shapes, is pre-reacted by sintering at a temperature of around 950° C. for approximately two hours. It is desirable to control loss of lead during the heating by suitable means, such as by carrying out the sintering in an enclosure containing a source of lead oxide vapor as explained in the aforementioned U.S. Letters Pat. No. 2,708,244. The specific conditions of sintering will, of course, depend on such variable factors as the size and shape of the batch, and may be selected in accordance with established ceramic techniques to suit the particular case, the object being to approach, as closely as possible, a complete reaction of the mixture.

Following the pre-sintering, the reacted material is allowed to cool and is then crushed and milled to a small particle size. When milling is completed, the pre-sintered mixture is ready for forming into the desired shapes and firing to maturity. Depending on preference and the shapes desired, the material may be formed into a mix or slip suitable for pressing, slip casting, or extruding, as the case may be, in accordance with conventional ceramic procedures.

The manganese component is incorporated into the compositions at any convenient time prior to the last described milling. Optimum properties are obtained, however, when the addition is made subsequent to the pre-sintering process. Accordingly a suitable proportion of $MnO_2$, $KMnO_4$ or other compound or manganese is preferably admixed with the reaction material immediately prior to the final milling.

After final milling the reacted powder is formed into suitable shapes and fired to ceramic maturity in a manner well known in the art. Additional details of the procedures which may be employed in the compounding the firing of the compositions may be had by reference to the aforementioned U.S. Letters Patent and copending applications.

The fired shapes are polarized in a manner also well known in the art, for example, by applying a pair of electrodes (e.g., 11, 14, FIGS. 1 and 2) to opposite faces of the ceramic bodies and applying an electrostatic field to the electrodes. While the particular conditions of polarization may be varied as desired, D.C. field strengths of 80 to 100 volts per mil, at room temperature, sustained for one hour have given satisfactory results.

The process described above can be simplified considerably by the combining of component ingredients, in suitable form, at the outset. However, the specific steps described are believed to result in optimum piezoelectric characteristics and accordingly comprise a preferred method of fabrication.

Examples of specific ceramic compositions according to the present invention and various pertinent physical, electrical and electromechanical properties thereof are given in the Table below. The various constants, coefficients and temperature characteristics listed are defined as follows:

K: Dielectric constant; permittivity of the material relative to permittivity of space.

$k_p$: Planar piezoelectric coupling coefficient.

Percent D: Dissipation-dielectric loss or power factor measured at 1000 c.p.s., expressed in percent.

$Q_M$: Mechanical quality factor—obtained from determination of minimum impedance at the fundamental resonance.

$\Delta Q_M$: Percent change in $Q_M$ over temperature range of $-40°$ C. to $+85°$ C.

For the sake of comparison the table below includes data on control compositions designated $O_1$, $O_2$, $O_3$, $O_4$ and $O_5$ which do not contain manganese according to the invention.

| Composition | Fe and Cr wt. percent | Mn wt. percent | $k_p$ | K | percent D | $Q_M$ | $\Delta Q_M$ percent |
|---|---|---|---|---|---|---|---|
| Example No.: | | | | | | | |
| $O_1$ — $Pb(Zr_{0.52}Ti_{0.48})O_3$ | None | None | 0.34 | 1,001 | 0.83 | 231 | |
| 1 — $Pb(Zr_{0.52}Ti_{0.48})O_3$ | None | .46 $KMnO_4$ | 0.56 | 1,000 | 0.70 | 372 | |
| $O_2$ — $Pb_{0.95}Mg_{0.05}(Zr_{0.445}Ti_{0.555})O_3$ | {.75 $Cr_2O_3$, .40 $Fe_2O_3$} | None | .233 | 471 | 0.5 | 1,479 | 87 |
| 2 — $Pb_{0.95}Mg_{0.05}(Zr_{0.445}Ti_{0.555})O_3$ | {.75 $Cr_2O_3$, .40 $Fe_2O_3$} | .46 $KMnO_4$ | .233 | 473 | 0.44 | 1,907 | 65 |
| $O_3$ — $Pb_{0.95}Mg_{0.03}Sr_{0.02}(Zr_{0.445}Ti_{0.555})O_3$ | {.75 $Cr_2O_3$, .40 $Fe_2O_3$} | None | .267 | 488 | 0.6 | 1,268 | |
| 3 — $Pb_{0.95}Mg_{0.03}Sr_{0.02}(Zr_{0.445}Ti_{0.555})O_3$ | {.75 $Cr_2O_3$, .40 $Fe_2O_3$} | .46 $KMnO_4$ | .235 | 515 | 0.7 | 2,011 | 73 |
| 4 — $Pb_{0.94}Sr_{0.06}(Zr_{0.52}Ti_{0.48})O_3$ | .60 $Fe_2O_3$ | .20 $MnO_2$ | 0.47 | 1,009 | 0.6 | 953 | |
| $O_4$ — $Pb_{0.94}Sr_{0.06}(Zr_{0.53}Ti_{0.47})O_3$ | .70 $Cr_2O_3$ | None | 0.45 | 1,052 | 2.35 | 535 | 190 |
| 5 — $Pb_{0.94}Sr_{0.06}(Zr_{0.53}Ti_{0.47})O_3$ | .70 $Cr_2O_3$ | 0.1 $MnO_2$ | 0.44 | 1,090 | 1.85 | 520 | 150 |
| 6 — $Pb_{0.94}Sr_{0.06}(Zr_{0.53}Ti_{0.47})O_3$ | .70 $Cr_2O_3$ | 0.25 $MnO_2$ | 0.50 | 1,140 | 1.60 | 980 | 100 |
| 7 — $Pb_{0.94}Sr_{0.06}(Zr_{0.53}Ti_{0.47})O_3$ | .70 $Cr_2O_3$ | 0.50 $MnO_2$ | 0.38 | 923 | 3.50 | 830 | 90 |
| $O_5$ — $Pb_{0.95}Mg_{0.05}(Zr_{0.45}Ti_{0.55})O_3$ | {.70 $Cr_2O_3$, .40 $Fe_2O_3$} | None | 0.26 | 440 | 0.45 | 1,870 | 50 |
| 8 — $Pb_{0.95}Mg_{0.05}(Zr_{0.45}Ti_{0.55})O_3$ | {.70 $Cr_2O_3$, .40 $Fe_2O_3$} | 0.20 $MnO_2$ | 0.29 | 476 | 0.39 | 2,030 | 50 |
| 9 — $Pb_{0.94}Sr_{0.06}(Zr_{0.53}Ti_{0.47})O_3$ | .70$Cr_2O_3$ | 0.47 $MnCO_3$ | 0.48 | 1,180 | 1.1 | 969 | 90 |

From the foregoing table it will be readily evident that al the examplary compositions are characterized by relatively high mechanical Q in comparison with the control compositions. Some of the exemplary compositions additionally show a moderate increase in dielectric constant K and mechanical coupling $k_p$ and a moderate decrease in dissipation.

The values of $\Delta Q_M$ in the above table indicate that the manganese addition also has a beneficial effect on the temperature stability of $Q_M$. For example control composition $O_4$ has a $\Delta Q_M$ value of 190 percent. With a 0.50 weight percent addition of $MnO_2$ the value of $\Delta Q_M$ is reduced to 90 percent.

The results listed in the table indicate that optimum properties are obtained with a manganese addition corresponding on a mol basis to an addition of approximately .25 weight percent of manganese oxide ($MnO_2$). An equivalent manganese addition is obtained by adding approximately 0.46 weight percent potassium permanganate or 0.33 weight percent of manganese carbonate.

Composition numbers 6 and 9 possess optimum electrical characteristics for electromechanical wave filter applications and are preferred compositions in accordance with the invention.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

It is claimed and desired to secure by Letters Patent of the United States:

1. A ferroelectric ceramic composition consisting essentialy of lead zirconate and lead titanate in a mol ratio of from 65:35 to 40:60 and containing manganese in a quantity corresponding on a mol basis to an addition of about 0.05 to 0.8 weight percent of manganese oxide.

2. A ferroelectric ceramic composition consisting essentially of lead zirconate and lead titanate effectively in solid solution in a mol ratio of from 65:35 to 40:60 and containing at least one element from the group consisting of chromium and uranium in an aggregate quantity corresponding on a mol basis to an addition of about 0.1 to 1.5 weight percent of chromium oxide and further containing manganese in a quantity corresponding on a mol basis to an addition of about 0.05 to 0.8 weight percent of manganese oxide.

3. A ferroelectric ceramic composition according to claim 2 containing a quantity of iron equivalent to 0.1 to 1.0 weight percent ferric oxide.

4. A ferroelectric ceramic composition as claimed in claim 2 further containing as a substitutent for an equivalent amount of lead therein from zero to 20 atom percent in the aggregate of at least one alkaline earth metal selected from the group consisting of barium, calcium, strontium and magnesium.

5. A ferroelectric ceramic composition according to claim 4 containing a quantity of iron equivalent to an addition of from 0.1 to 1.0 weight percent of ferric oxide.

6. A novel composition of matter consisting essentially of lead zirconate and lead titanate effectively in solid solution in a mol ratio of from 65:35 to 40:60, and containing, as a substituent for an equivalent amount of lead therein, from zero to 20 atom percent in the aggregate of at least one alkaline earth metal selected from the group consisting of barium, calcium, strontium, and magnesium and further containing manganese in a quantity corresponding on a mol basis to an addition of about 0.05 to 0.8 weight percent of manganese oxide.

7. A dielectric ceramic body formed of a solid solution consisting essentially of electromechanically sensitive lead zirconate-lead titanate and containing manganese in an amount corresponding on a mol basis to an addition of about 0.05 to 0.8 weight percent of manganese oxide.

8. A dielectric ceramic body formed of a solid solution consisting essentially of electromechanically sensitive lead zirconate-lead titanate and containing at least one element selected from the group consisting of chromium and uranium, in an aggregate quantity corresponding on a mol basis to an addition of about 0.1 to 1.5 weight percent of chromium oxide and further containing manganese in an amount equivalent to from 0.05 to 0.8 weight percent of manganese oxide.

9. A composition of matter consisting essentially of a base material selected from those defined by and included within the area ABCD of the diagram of FIG. 3 and containing manganese in an amount corresponding on a mol basis to an addition of about 0.05 to 0.8 weight percent of manganese oxide.

10. A composition of matter according to claim 9 wherein up to 20 atom percent of the lead in said base material is substituted for by at least one alkaline earth element selected from the group consisting of barium, calcium, strontium and magnesium.

11. A composition of matter according to claim 10 containing a quantity of iron equivalent to from 0.1 to 1.0 weight percent of ferric oxide.

12. A composition of matter according to claim 9 containing at least one member of the group consisting of chromium and uranium in a total quantity corresponding on a mol basis to about 0.1 to 1.5 weight percent chromic oxide.

13. A composition of matter according to claim 12 wherein said base material is selected from the area EFGH of the diagram of FIG. 3.

14. A composition of matter according to claim 13 wherein up to 25 atom percent of the lead in said base material is substituted for by at least one alkaline earth element selected from the group consisting of barium, calcium, strontium and magnesium.

15. A composition of matter according to claim 14 containing a quantity of iron equivalent to from 0.1 to 1.0 weight percent of ferric oxide.

16. A composition of matter consisting essentially of a solid solution having essentially the constituency indicated by the formula

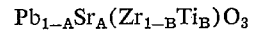

where A is from 0 to 0.15, B is from 0.35 to 0.60, said solid solution containing manganese in an amount corresponding in a mol basis to an addition of about 0.05 to 0.8 weight percent manganese oxide and chromium in an amount corresponding on a mol basis to an addition of from 0.1 to 1.5 weight percent chromic oxide.

17. A composition of matter consisting essentially of a solid solution having essentially the constituency indicated by the formula

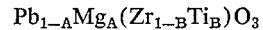

where A is from 0 to .10 and B is from 0.35 to 0.60, said solid solution containing manganese in an amount corresponding on a mol basis to an addition of about 0.05 to 0.8 weight percent manganese oxide, chromium in an amount corresponding on a mol basis to an addition of 0.1 to 1.5 weight percent chromic oxide and iron in an amount corresponding on a mol basis to an addition of 0.1 to 1.0 weight percent of ferric oxide.

18. A composition of matter corresponding to the formula $Pb_{1-u}Me_u(Zr_xTi_ySn_z)O_3$ wherein Me represents at least one member selected from the group consisting of calcium, strontuim, barium, magnesium, and mixtures thereof, the subscripts $u$, $x$, $y$, and $z$ have the numerical values $u = 0.00$–$0.20$
$x = 0.00$–$0.90$
$y = 0.10$–$0.60$
$z = 0.00$–$0.65$ and
$x + y + z = 1.00$ and wherein said composition contains manganese in an amount corresponding on a mol basis to an addition between 0.05 and 0.80 weight percent of manganese oxide.

References Cited

UNITED STATES PATENTS

| | | | |
|---|---|---|---|
| 2,961,554 | 11/1960 | Cook et al. | 106—39 |
| 2,980,546 | 4/1961 | Plessner et al. | 106—39 |
| 3,068,177 | 12/1962 | Sugden | 252—62.9 |
| 3,179,594 | 4/1965 | Kulcsar et al. | 106—39 |

TOBIAS E. LEVOW, Primary Examiner

R. D. EDMONDS, Assistant Examiner

U.S. Cl. X.R.

106—39